United States Patent
Doonan et al.

(10) Patent No.: US 6,635,127 B2
(45) Date of Patent: Oct. 21, 2003

(54) STEEL STRAPPING AND METHOD OF MAKING

(75) Inventors: Jeffery W Doonan, Figtree (AU); Peter Ivan Unicomb, Kiama Downs (AU); Robert K Armstrong, Minnamurra (AU)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/919,946

(22) Filed: Aug. 2, 2001

(65) Prior Publication Data

US 2003/0034100 A1 Feb. 20, 2003

(51) Int. Cl.$^7$ .................. C22C 38/14; C22C 38/12; C21D 8/02
(52) U.S. Cl. .................. 148/320; 148/328; 148/603; 148/651; 148/652
(58) Field of Search .................. 148/320, 328, 148/603, 651, 652

(56) References Cited

U.S. PATENT DOCUMENTS 4,816,090 A * 3/1989 Doonan et al.
6,162,308 A * 12/2000 Heckelmann et al. ....... 148/603

OTHER PUBLICATIONS

English abstract of Japanese patent 358022327A, Feb. 8, 1983.*

* cited by examiner

*Primary Examiner*—Deborah Yee
(74) *Attorney, Agent, or Firm*—Miles & Stockbridge P.C.; John C. Kerins

(57) ABSTRACT

Steel strapping and a method of manufacturing steel strapping are disclosed. The steel strapping has the following composition in wt % and a microstructure including a matrix of recovery-annealed cold worked ferrite containing martensite and carbides dispersed through the matrix.

| | |
|---|---|
| C: | up to 0.2 |
| Mn: | up to 2.0 |
| Si: | 0.2–0.4 |
| Ti: | 0.025–0.045 |
| V: | 0.05–0.07 |
| Cr: | up to 0.25 |
| Ni: | up to 0.30 |
| Mo: | up to 0.10 |
| N: | up to 0.005 |
| Cu: | up to 0.20 |
| Al: | up to 0.08 |
| Nb: | up to 0.005 |
| P: | up to 0.035 |
| S: | up to 0.020 |
| Balance | iron and incidental impurities. |

15 Claims, No Drawings

STEEL STRAPPING AND METHOD OF MAKING

The present invention relates to steel strapping.

Steel strapping is formed by slitting cold rolled steel strip into a required width and is used in a variety of applications that require a range of properties. Generally, the properties which must be considered when producing strapping are tensile strength, ductility, notch properties and work hardening. These properties are dependent on the composition of the steel and the heat treatment processes applied to the strapping.

The minimum tensile strength of steel strapping varies between 500 and 1250 MPa.

Strapping having tensile strengths in the range 500 to 800 MPa is manufactured and sold by the applicant as 'standard' strapping.

Strapping having tensile strengths in excess of 800 MPa is manufactured and sold by the applicant as 'super' strapping.

Standard strapping is generally formed from low carbon steels and may be used in its cold rolled and slit form without heat treatment in applications requiring moderate strength levels, for example in the securing of cardboard cartons to pallets. In some instances standard strapping is formed from medium carbon steels and is subjected to a stress relief annealing treatment or a blueing heat treatment in order to improve ductility.

Super strapping is generally formed from medium carbon steels and the strapping is subjected to heat treatment to provide required properties. Super strapping is used in heavy duty applications requiring medium to high tensile strength and good ductility, notch properties and work hardening. Uses include unitising of steel pipe into bundles, fastening heavy loads to pallets and containing high-density wool and cotton bales.

The basic production steps for super strapping are as follows:

(a) hot rolling steel slabs to form strip;
(b) cold rolling strip to a required strip thickness;
(c) slitting the strip to form strapping;
(d) heat treating the strapping to produce target mechanical properties and microstructure.

U.S. Pat. No. 4,816,090 of the applicant discloses a heat treatment process for steel strapping that comprises:

(a) rapidly heating the strapping to the dual phase temperature range using induction heating, with little or no soaking, and
(b) rapidly cooling the strapping to form a microstructure comprising a matrix of recovery annealed cold worked ferrite containing martensite and carbides dispersed throughout the matrix.

The term "dual phase" as used herein is understood to mean the phase equilibrium region where austenite and ferrite phases co-exist.

The U.S. patent discloses a heat treated steel strapping which is characterised by a microstructure comprising a matrix of recovery annealed cold worked ferrite containing martensite and carbides dispersed through the matrix.

The U.S. patent discloses that the composition of the steel preferably comprises less than 0.2 wt % C and is characterised by alloying elements that form precipitates which retard recrystallisation during the heat treatment process.

The U.S. patent discloses that titanium and niobium are preferred alloying elements.

The U.S. patent discloses that titanium may be present in the range 0.06–0.15 wt % and preferably 0.08 wt % and niobium may be present in the range 0.02 to 0.05 wt % and preferably about 0.04 wt %.

The applicant has manufactured commercially in Australia steel strapping disclosed in the U.S. patent by hot rolling steel slabs to form strip, typically 2.0 mm thick, cold rolling the strip, typically to a final strip thickness of 0.8 mm, slitting the strip to form strapping, and thereafter heat treating the strapping in an induction heating unit.

The applicant has encountered severe problems in the hot rolling step, with the result that the yield has been very low.

The applicant has determined that the problems were due to titanium in the steel causing inconsistent recrystallisation behaviour in the hot strip mill.

Titanium is an important element in the steel composition. Titanium is important because it forms precipitates of titanium carbides and, as noted above, these precipitates retard recrystallisation process during the heat treatment process. This, together with the rapid heating cycle in the heat treatment process, causes the retention of considerable cold work in the microstructure resulting in a substantial contribution to strength of the strapping.

As noted above, the U.S. patent discloses a titanium range of 0.06–0.15 wt %. The severe hot rolling problems that were encountered by the applicant were encountered when hot rolling steel having a titanium concentration of 0.065 wt %, ie towards the lower end of the range. This steel is referred to hereinafter as XAK15 feed steel.

The applicant has recognised that reducing or removing titanium altogether from the steel strapping composition, whilst overcoming the hot strip mill problems, would have a significant adverse impact on the mechanical properties, particularly tensile strength, of the strapping.

The applicant has carried out research project and has found that the above-described hot rolling problem could be overcome by using steel having the following composition, in wt %.

| | |
|---|---|
| C: | up to 0.2 |
| Mn: | up to 2.0 |
| Si: | 0.2–0.4 |
| Ti: | 0.025–0.045 |
| V: | 0.05–0.07 |
| Cr: | up to 0.25 |
| Ni: | up to 0.30 |
| Mo: | up to 0.10 |
| N: | up to 0.005 |
| Cu: | up to 0.20 |
| Al: | up to 0.08 |
| Nb: | up to 0.005 |
| P: | up to 0.035 |
| S: | up to 0.020 |
| Balance | iron and incidental impurities. |

Specifically, the applicant has found that the above-described steel composition is not subject to the severe hot rolling problems encountered by XAK15 feed steel.

The applicant has found also that strapping manufactured from the above-described steel composition has mechanical properties, such as tensile strength, that are at least comparable to those of strapping made from XAK15 feed steel.

In particular, the applicant has found that at least comparable mechanical properties could be obtained by manufacturing strapping by hot rolling, cold rolling, and thereafter heat treating the steel composition to form a microstructure comprising a matrix of recovery-annealed cold worked ferrite containing martensite and carbides dispersed through the matrix.

The applicant believes that the addition of V to the steel composition and the reduction in the concentration of Ti in the composition (compared to the Ti concentration in XAK15 feed steel) prevented hot roll formability problems in the hot strip mill and that the addition of V resulted in good mechanical properties. In particular, the applicant believes that the addition of V and the reduction in the concentration of Ti made it possible to achieve consistent recrystallisation of steel in the hot strip mill and, more particularly, recrystallisation of steel in each stand of the hot strip mill Preferably the microstructure includes up to 15 vol % carbides.

Preferably the microstructure includes 5–10 vol % martensite.

Accordingly, the present invention provides a steel strapping having the above-described composition and microstructure.

Preferably the Ti concentration in the composition is 0.03 to 0.04 wt %.

Preferably the Mn concentration in the composition is 0.8 to 1.2 wt %.

Preferably the Al concentration in the composition is 0.015 to 0.08 wt %.

Preferably the tensile strength of the strapping is at least 900 Mpa.

Preferably the tensile strength of the strapping is at least 100 Mpa.

In addition, according to the present invention there is provided a method of manufacturing steel strapping which includes the steps of:

(a) hot rolling steel slabs by passing the slabs through a series of rolling mill stands in a hot strip mill and reducing the slab thickness to form steel strip;

(b) cold rolling the steel strip in a cold rolling mill and reducing the thickness of the strip; and (c) heat treating the steel strip to produce steel strapping, and the method being characterised by selecting the hot rolling conditions and the steel slab composition so that there is recrystallisation of steel in each stand of the hot rolling mill.

The above-described method is based on the realisation that hot rolled steel having required mechanical properties could be produced on a consistent basis, i.e. at high yields, by ensuring that there is at least some recrystallisation of steel in each mill stand.

Preferably heat treatment step (c) includes:

(i) rapidly heating the strapping to the dual phase temperature range using induction heating, with little or no soaking, and (ii) rapidly cooling the strapping.

Preferably the method produces strapping having a microstructure comprising a matrix of recovery annealed cold worked ferrite containing martensite and carbides dispersed throughout the matrix.

Preferably the method further includes a step of slitting the cold rolled steel strip prior to heat treatment step (c).

The above-described steel composition is suitable for use in the above-described method.

A preferred steel strapping composition and method of manufacturing the strapping at the steelworks of the applicant in Pt. Kembla, Australia is summarised below.

1. Steelmaking

TABLE 1

| 1.1 - Steel Analysis | |
|---|---|
| C | 0.15–0.19 |
| P | 0.35X |
| Mn | 0.80–1.20 |
| Si | 0.35X |
| S | 0.020X |
| Ni | 0.30X |
| Cr | 0.25X |
| Mo | 0.10X |
| Cu | 0.20X |
| Al | 0.015–0.080 |
| Sn | 0.050.X |
| N | 0.005X |
| NB | 0.005X |
| Ti | 0.025–0.045 |
| V | 0.050∝0.070 |

2. Hot Rolling 2.1 Slab Sizes—as Received at the Hot Strip Mill ("HSM")

230 mm thick×1025 mm width×11.65 m in length

Slab weight of approximately 21.5 tonnes 2.2 HSM Operating Temperatures

Exit Reheat Furnace: 1250 degrees C.

HSM Finishing Temperature: 900 degrees C.

Coiling Temperature: 570 degrees C.

Hot Band Thickness: 2.0 mm 2.3 Hot Rolled Structure

The hot rolled microstructure consists of fine equiaxed ferrite and pearlite/bainite.

2.4 Mechanical Properties

Mechanical properties of the induction feed after hot rolling are as follows:

UTS(MPa) typically 600–650 MPa

Hardness typically 55–57RA

Elongation typically 20%(50 mm)

3. Pickle Line

Prior to pickling, the effective titanium equation (% Ti-3.4×% N) minimum of 0.020 is applied.

The incoming strip width is 960 mm and side trimming reduces the width to 944 mm.

4. Cold Rolling 4.1 Incoming Feed 2,0 mm thick, hot rolled, pickled and oiled coils are cold rolled to 0.805 nm thickness.

4.2 Microstructure

The 60% thickness reduction from 2.0 to 0.80 mm results in a microstructure consisting of fine fragmented carbides in a heavily cold worked ferritic matrix.

4.3 Mechanical Properties

The 60% cold reduction and microstructure result in the strip having the following typical mechanical properties:

UTS(MPa): 1000–1050 MPa

Breaking Force(KN): 16KN

Hardness: 65RA

Elongation(50 mm): 4%

Bend test (180 deg): 7

5. Slitting

The strip is centre-slit, with no side trim.

The resultant 472 mm wide coils receive approximately 16 mm side trim (each side) during final slitting.

6. Strapping Line

6.1 Line Conditions

Induction line process settings are as follows:

|  | A Converter | B Converter |
|---|---|---|
| Capacity Usage | 50% | 100% |
| Operating Temperature | 580–590 deg | 750 deg aim |
| Power Input | 317 kW | 286 kW |
| Voltage | 546 aim | 914 aim |
| Line Speed (19080) | 55 m/m |  |

The induction line is operated to heat strapping rapidly to 750 degrees C., hold the strapping at temperature for 2 seconds, and rapidly cool the strapping to ambient temperature.

6.2 Mechanical Properties

The above-described combination of steel chemistry, incoming cold rolled structures and induction heat treatment, results in the following typical mechanical properties:

UTS: 970–1070 MPa

Breaking Force: 15.5KN

% Elongation: 10–14% (50 mm)

Hardness: 65–67HRA

Bend test(180 deg) 13

The applicant has tested strapping manufactured as described above and strapping manufactured from XAK15 feed steel under the same general processing conditions.

The results obtained indicate that the steel composition of Table 1 as set out above is superior to XAK15 feed steel for manufacturing strapping due to significantly better hot formability than XAK15 steel.

In addition, the results of the testwork indicate that strapping manufactured from the Table 1 composition has a higher (typically 5%) tensile strength than XAK15-sourced strapping.

Furthermore, the results of the testwork indicate that the tensile strength of strapping manufactured from the Table 1 composition is more consistent with less variation between individual test results than that achieved with XAK15-sourced strapping.

Furthermore, the results of the testwork indicate that strapping manufactured from the Table 1 composition has a higher ductility (typically 1%) than XAK15-sourced strapping.

Many modifications may be made to the preferred embodiment of the present invention as described above without departing from the spirit and scope of the invention.

The claims defining the invention are as follows:

1. A steel strapping having the following composition in wt % and a microstructure including a matrix of recovery-annealed cold worked ferrite containing martensite and carbides dispersed through the matrix

| C: | up to 0.2 |
|---|---|
| Mn: | up to 2.0 |
| Si: | 0.2–0.4 |
| Ti: | 0.025–0.045 |
| V: | 0.05–0.07 |
| Cr: | up to 0.25 |
| Ni: | up to 0.30 |
| Mo: | up to 0.10 |
| N: | up to 0.005 |
| Cu: | up to 0.20 |
| Al: | up to 0.08 |
| Nb: | up to 0.005 |
| P: | up to 0.035 |
| S: | up to 0.020 |
| Balance | iron and incidental impurities. |

2. The strapping defined in claim 1 wherein the microstructure includes up to 15 vol % carbides.

3. The strapping defined in claim 2 wherein the microstructure includes up to 5–10 vol % martensite.

4. The strapping defined in claim 1 wherein the Ti concentration in the composition is 0.03 to 0.04 wt %.

5. The strapping defined in claim 1 wherein the Mn concentration in the composition is 0.8 to 1.2 wt %.

6. The strapping defined in claim 1 wherein the Al concentration in the composition is 0.015 to 0.08 wt %.

7. The strapping defined in claim 1 wherein the tensile strength of the strapping is at least 900 Mpa.

8. The strapping defined in claim 7 wherein the tensile strength of the strapping is at least 1000 Mpa.

9. A method of manufacturing steel strapping which includes the steps of:
   (a) hot rolling steel slabs by passing the slabs through a series of rolling mill stands in a hot strip mill and reducing the slab thickness to form steel strip;
   (b) cold rolling the steel strip in a cold rolling mill and reducing the thickness of the strip; and
   (c) heat treating the steel strip to produce steel strapping, the method being characterized by selecting the hot rolling conditions and the steel slab composition so that there is recrystallisation of steel in each stand of the hot rolling mill, and
   wherein the strapping produced by the method has a microstructure comprising a matrix of recovery annealed cold worked ferrite containing martensite and carbides dispersed throughout the matrix.

10. The method defined in claim 9 further includes a step of slitting the cold rolled steel strip prior to the heat treatment step.

11. The method defined in claim 9 wherein the feed steel has the following composition in wt %:

| C: | up to 0.2 |
|---|---|
| Mn: | up to 2.0 |
| Si: | 0.2–0.4 |
| Ti: | 0.025–0.045 |
| V: | 0.05–0.07 |
| Cr: | up to 0.25 |
| Ni: | up to 0.30 |
| Mo: | up to 0.10 |
| N: | up to 0.005 |
| Cu: | up to 0.20 |
| Al: | up to 0.08 |
| Nb: | up to 0.005 |
| P: | up to 0.035 |
| S: | up to 0.020 |
| Balance | iron and incidental impurities. |

12. The strapping defined in claim 11 wherein the Ti concentration in the composition is 0.03 to 0.04 wt %.

13. The strapping defined in claim 11 wherein the Mn concentration in the composition is 0.8 to 1.2 wt %.

14. The strapping defined in claim 11 wherein the Al concentration in the composition is 0.015 to 0.08 wt %.

15. A method of manufacturing steel strapping which includes the steps of:

(a) hot rolling steel slabs by passing the slabs through a series of rolling mill stands in a hot strip mill and reducing the slab thickness to form steel strip;

(b) cold rolling the steel strip in a cold rolling mill and reducing the thickness of the strip; and (c) heat treating the steel strip to produce steel strapping, the method being characterized by selecting the hot rolling conditions and the steel slab composition so that there is recrystallisation of steel in each stand of the hot rolling mill, and wherein heat treatment step (c) includes:
  (i) rapidly heating the strapping to the dual phase temperature range using induction heating, with little or no soaking, and
  (ii) rapidly cooling the strapping.

* * * * *